United States Patent
Bart et al.

(10) Patent No.: US 10,958,835 B1
(45) Date of Patent: *Mar. 23, 2021

(54) AUTONOMOUS DRONE WITH IMAGE SENSOR

(71) Applicant: Alarm.com Incorporated, Tysons, VA (US)

(72) Inventors: Gary Franklin Bart, Weston, FL (US); Erdal Caglayan, Tysons, VA (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/663,640

(22) Filed: Oct. 25, 2019

Related U.S. Application Data

(63) Continuation of application No. 15/918,211, filed on Mar. 12, 2018, now Pat. No. 10,462,366.

(60) Provisional application No. 62/469,778, filed on Mar. 10, 2017.

(51) Int. Cl.
| | |
|---|---|
| *H04N 7/18* | (2006.01) |
| *H04N 5/232* | (2006.01) |
| *H04W 4/38* | (2018.01) |
| *G06K 9/00* | (2006.01) |
| *G06K 9/62* | (2006.01) |

(52) U.S. Cl.
CPC ....... *H04N 5/23241* (2013.01); *G06K 9/0063* (2013.01); *G06K 9/6288* (2013.01); *H04N 5/23206* (2013.01); *H04W 4/38* (2018.02)

(58) Field of Classification Search
CPC . H04N 5/23241; H04N 5/23206; H04W 4/38; G06K 9/0063; G06K 9/6288
See application file for complete search history.

(56) References Cited

U.S. PATENT DOCUMENTS

| | | | |
|---|---|---|---|
| 2011/0049290 A1 | 3/2011 | Seydoux et al. | |
| 2015/0225081 A1* | 8/2015 | Stabler | G05D 1/0088 701/3 |
| 2015/0316927 A1* | 11/2015 | Kim | H04L 67/12 701/2 |
| 2016/0144982 A1 | 5/2016 | Sugunnaran | |
| 2016/0173742 A1 | 6/2016 | Hassan Zureikat | |
| 2016/0297545 A1 | 10/2016 | Yang et al. | |
| 2017/0019644 A1 | 1/2017 | K V et al. | |
| 2017/0043869 A1 | 2/2017 | Howard et al. | |
| 2017/0078553 A1 | 3/2017 | Sron et al. | |
| 2017/0090484 A1 | 3/2017 | Obaidi | |

(Continued)

*Primary Examiner* — John R Schnurr
(74) *Attorney, Agent, or Firm* — Fish & Richardson P.C.

(57) ABSTRACT

A monitoring system that is configured to monitor a property is disclosed. In one aspect, the monitoring system includes one or more sensors that are located throughout the property and that are configured to generate sensor data. The monitoring system further includes a drone that is configured to move throughout the property and generate additional sensor data. The monitoring system further includes a drone dock that is configured to receive the drone, wherein the drone is configured to continue generating the additional sensor data while the drone dock is receiving the drone. The monitoring system further includes a monitor control unit that is configured to receive the sensor data and the additional sensor data, analyze the sensor data and the additional sensor data, determine a status of the property, and provide, for output, data indicating the status of the property.

20 Claims, 3 Drawing Sheets

(56) References Cited

U.S. PATENT DOCUMENTS

| | | |
|---|---|---|
| 2017/0178474 A1 | 6/2017 | Olson et al. |
| 2017/0197714 A1 | 7/2017 | Golden |
| 2018/0141657 A1 | 5/2018 | Han |
| 2018/0233007 A1 | 8/2018 | Williams |

* cited by examiner

AUTONOMOUS DRONE WITH IMAGE SENSOR

CROSS-REFERENCE TO RELATED APPLICATIONS

This application is a continuation of U.S. application Ser. No. 15/918,211, filed Mar. 12, 2018, which claims the benefit of U.S. Provisional Application No. 62/469,778, filed Mar. 10, 2017. Both of these prior applications are incorporated by reference in their entirety.

TECHNICAL FIELD

This disclosure relates to autonomous drones.

BACKGROUND

An unmanned aerial vehicle (UAV), or a drone device, refers to an electronic device that is capable of navigating, either under remote control by a human operator, or fully or intermittently autonomously, by onboard or remote computers. Drone devices can be associated with a monitoring system of a property to perform various types of monitoring operations of the property. For example, a camera of a drone device can capture video footage of a property premises while performing a surveillance operation. A drone device may be powered by one or more batteries for operations.

SUMMARY

A drone device may be designed such that it operates indoors as a roving video and audio surveillance device. An indoor drone that is capable of flying within a building autonomously for the purpose of surveilling the building by enabling the live viewing or recording of video and/or audio has several limitations that this invention addresses.

One limitation of drone technology is that once battery power has been depleted, a drone typically requires a person either to connect the drone to a power source for charging of its batteries, or to swap out a set of batteries. As such, an autonomous drone would only be autonomous until such time as power was depleted, at which point, if it has not safely landed or docked somewhere, it may fall to the ground and be unable to fly again without human intervention.

One of the benefits of certain indoor drones is the ability to operate independently and/or remotely. As drones have limited flight time due to the constraints of battery size and capacity versus their weight and impact on aerodynamic lift of the overall drone system, it would be ideal if the drone could have a fixed home location where it has the ability to charge its batteries and to which it would return after a flight period so that it would be available and adequately charged to fly another time.

An innovative aspect of the subject matter described in this specification may be implemented in a monitoring system that is configured to monitor a property and that includes one or more sensors that are located throughout the property and that are configured to generate sensor data; a drone that is configured to move throughout the property and generate additional sensor data; a drone dock that is configured to receive the drone, where the drone is configured to continue generating the additional sensor data while the drone dock is receiving the drone; and a monitor control unit that is configured to receive the sensor data and the additional sensor data; analyze the sensor data and the additional sensor data; based on analyzing the sensor data and the additional sensor data, determine a status of the property; and provide, for output, data indicating the status of the property.

These and other implementations can each optionally include one or more of the following features. The drone dock is configured to charge a battery of the drone while the drone dock is receiving the drone. The drone includes a camera that is configured to generate image data while the drone is moving throughout the property and while the drone dock is receiving the drone. The monitor control unit is configured to receive the additional sensor data by receiving the image data; analyze the additional sensor data by analyzing the image data; and determine the status of the property based further on analyzing the image data. The drone is configured to magnetically couple to the drone dock. The drone dock is configured to receive a top portion of the drone and a sensor of the drone is located on a bottom of the drone. The drone dock includes a permanent magnet and an electromagnet that is configured to cancel a magnetic force of the permanent magnet based on the electromagnet receiving electric current.

The drone includes a ferromagnetic material that is configured to couple to the permanent magnet. The drone includes a mechanical release mechanism that is configured to release the drone from the permanent magnet. The monitoring system includes an additional drone dock that is configured to receive the drone. The drone is configured to transmit, to the monitor control unit, data indicating whether the drone dock or the additional drone dock received the drone, based on the drone dock or the additional drone dock receiving the drone. The monitoring system includes an additional drone dock that is configured to receive the drone. The monitor control unit is configured to transmit, to the drone, instructions to dock at a particular one of the drone dock or the additional drone dock. The monitor control unit is configured to select the particular one of the drone dock or the additional drone dock based on the status of the property. The monitoring system includes an additional drone dock that is configured to receive the drone. The drone is configured to select a particular one of the drone dock or the additional drone dock for receiving the drone based on a status of the drone.

Another innovative aspect of the subject matter described in this specification may be implemented in a method that includes the actions of receiving, by a monitoring system that is configured to monitor a property, sensor data from one or more sensors that are located throughout the property; receiving, by the monitoring system and from a drone that is configured to move throughout the property and that is located on a drone dock at the property, additional sensor data; analyzing, by the monitoring system, the sensor data and the additional sensor data; based on analyzing the sensor data and the additional sensor data, determining, by the monitoring system, a status of the property; and providing, for output by the monitoring system, data indicating the status of the property.

These and other implementations can each optionally include one or more of the following features. The action of receiving the additional sensor data includes receiving data indicating a location of the drone dock. The action of analyzing the sensor data and the additional sensor data includes analyzing the sensor data, the additional sensor data, and the data indicating the location of the drone dock. The actin of determining the status of the property is based further on the data indicating the location of the drone dock. An additional drone dock is located at the property. The actions further include transmitting, to the drone and by the monitoring system, instructions to dock at a particular one of the drone dock or the additional drone dock. The actions further include selecting, by the monitoring system, the particular one of the drone dock or the additional drone dock based on the status of the property. An additional drone dock is located at the property. The drone is configured to determine whether to dock at the drone dock or the additional drone dock based on a status of the drone. The drone includes a camera that is configured to generate image data while the drone is moving throughout the property and while the drone is located on the drone dock.

The action of receiving the additional sensor data includes receiving the image data. The action of analyzing additional sensor data includes analyzing the image data. The action of determining the status of the property is based further on analyzing the image data. The action of receiving, by the monitoring system and from a drone that is configured to move throughout the property and that is located on a drone dock at the property, additional sensor data includes receiving, by the monitoring system and from the drone that is magnetically coupled to the drone dock, the additional sensor data. The action of receiving, by the monitoring system and from a drone that is configured to move throughout the property and that is located on a drone dock at the property, additional sensor data includes receiving, by the monitoring system and from the drone that includes a top portion that is coupled to the drone dock and a bottom sensor that includes a sensor, the additional sensor data. The action of receiving, by the monitoring system and from a drone that is configured to move throughout the property and that is located on a drone dock at the property, additional sensor data includes receiving, by the monitoring system and from the drone that is coupled to the drone dock that is charging a battery of the drone, the additional sensor data.

Other implementations of this aspect include corresponding systems, apparatus, and computer programs recorded on computer storage devices, each configured to perform the operations of the methods.

Particular implementations of the subject matter described in this specification can be implemented so as to realize one or more of the following advantages. A monitoring system may leverage a sensor of a drone while the drone is charging, which would normally be a time when the drone is inoperable. The drone may generate sensor data while on a dock and mimic a stationary sensor.

The details of one or more implementations of the subject matter described in this specification are set forth in the accompanying drawings and the description below. Other features, aspects, and advantages of the subject matter will become apparent from the description, the drawings, and the claims.

DESCRIPTION OF DRAWINGS

In the drawings, like reference numbers represent corresponding parts throughout.

DETAILED DESCRIPTION

Figure 1:
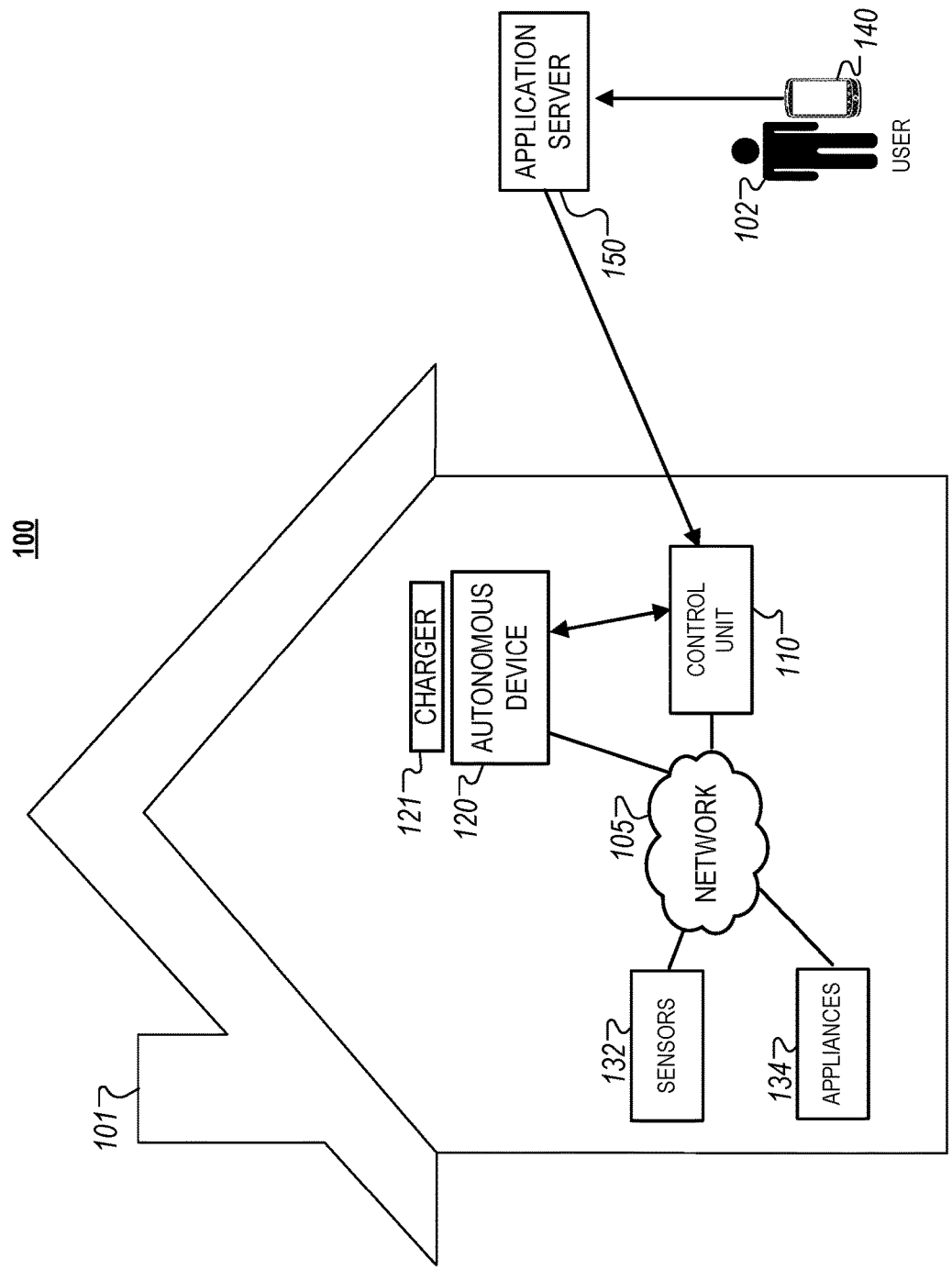
FIG. 1 illustrates an example of a system of an autonomous device docking at a charger.

FIG. 1 illustrates an example of an electronic system 100 having an autonomous device. The electronic system 100 includes a monitor control unit 110, an autonomous device 120, sensors 132, appliances 134, a user device 140, and an application server 150 connected over a network 105 within a property 101. The user device 140 can be associated with a user 102 such that the user 102 may communicate and/or control the autonomous device 120 and/or other components of the electronic system 100.

In general, the system 100 may deploy the autonomous device 120 at various time points to collect data associated with the property 101. In some instances, an onboard camera of the autonomous device 120 may capture pictures of the designated objects to identify a location, placement, configuration, condition, and/or operability of an object for a corresponding time point when autonomous device 120 is deployed to the property 101. In other instances, the autonomous device 120 may additionally, or alternatively, obtain data that is collected by the sensors 132 prior to, or during, the deployment time period. For instance, the autonomous device 120 may obtain a video footage of the interior of the property captured by a security camera placed within the property 101, temperature data collected by a thermostat, or other types of sensor data.

The network 105 is configured to enable exchange of electronic communications between devices connected to the network 105. For example, the network 105 may be configured to enable exchange of electronic communications between the monitor control unit 110, the autonomous device 120, the sensors 132, the appliances 134, the user device 140, and the application server 150. The network 105 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 105 may include multiple networks or subnetworks, each of which may include, for example, a wired or wireless data pathway. The network 105 may include a circuit-switched network, a packet-switched data network, or any other network able to carry electronic communications (e.g., data or voice communications). For example, the network 105 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 105 may include one or more networks that include wireless data channels and wireless voice channels. The network 105 may be a wireless network, a broadband network, or a combination of networks including a wireless network and a broadband network.

The monitor control unit 110 may include a controller and a network module. The controller is configured to control a monitoring system (e.g., a home alarm or security system) that includes the autonomous device 120. In some examples, the controller may include a processor or other control circuitry configured to execute instructions of a program that controls operation of an alarm system. In these examples, the controller may be configured to receive input from sensors, detectors, or other devices included in the alarm system and control operations of devices included in the alarm system or other household devices (e.g., a thermostat, an appliance, lights, etc.). For example, the controller may be configured to control operation of the network module included in the autonomous device 120.

The network module is a communication device configured to exchange communications over the network 105. The network module may be a wireless communication module configured to exchange wireless communications over the network 105. For example, the network module may be a wireless communication device configured to exchange communications over a wireless data channel and a wireless voice channel. In this example, the network module may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module also may be a wired communication module configured to exchange communications over the network 105 using a wired connection. For instance, the network module may be a modem, a network interface card, or another type of network interface device. The network module may be an Ethernet network card configured to enable the autonomous device 120 to communicate over a local area network and/or the Internet. The network module also may be a voice band modem configured to enable the alarm panel to communicate over the telephone lines of Plain Old Telephone Systems (POTS).

The autonomous device 120 may be any type of electronic device that is capable of moving and taking actions that assist in security monitoring. For example, the autonomous device 120 may be an unmanned device (e.g., a drone device), a robotic device, or any other type of device that is capable of moving throughout the property 101 based on automated control technology and/or user input control provided by a user. In some examples, the autonomous device 120 may be able to fly, roll, walk, or otherwise move about the property 101.

In various implementations, the autonomous device 120 may be a helicopter type device (e.g., a quad copter), a rolling helicopter type device (e.g., a roller copter device that can fly and also roll along the grounds, walls, or ceiling), a land vehicle type device (e.g., automated cars that drive around a property), or a plane type device (e.g., unmanned aircraft). In some instances, the autonomous device 120 may be a robotic device that is intended for other purposes and associated with the system 100 for use in appropriate circumstances. For instance, a security drone may be associated with the system 100 as the autonomous device 120 and may be controlled to take action responsive to system events.

The autonomous device 120 can be configured to automatically navigate within the property 101. For instance, the autonomous device 120 may include sensors and control processors that guide movement of the autonomous device 120 within the property. The autonomous device 120 may navigate within the property using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The autonomous device 120 may include control processors that process output from the various sensors and control the autonomous device 120 to move along a navigational route that reaches the desired destination and avoids obstacles. In this regard, the control processors detect walls or other obstacles in the property and guide movement of the autonomous device 120 in a manner that avoids the walls and other obstacles.

In addition, the autonomous device 120 may store data that describes attributes of the property 101. For instance, the autonomous device 120 may store a floorplan and/or a three-dimensional model of the property 101 that enables the autonomous device 120 to navigate the property 101. During initial configuration, the autonomous device 120 may receive the data describing attributes of the property 101, determine a frame of reference to the data (e.g., a home or reference location in the property 101), and navigate the property 101 based on the frame of reference and the data describing attributes of the property 101.

Further, initial configuration of the autonomous device 120 also may include learning of one or more navigation patterns in which a user or a system administrator provides input to control the autonomous device 120 to perform a specific navigation action (e.g., fly to an upstairs bedroom and spin around while capturing video and then return to a home charging base). In this regard, the autonomous device 120 may learn and store the navigation patterns such that the autonomous device 120 may automatically repeat the specific navigation actions when instructed to assist a user during a detected emergency condition at the property.

In some implementations, the autonomous device 120 may include data capture and recording devices. In these examples, the autonomous device 120 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the property and users in the property.

In some implementations, the autonomous device 120 may include output devices. In these implementations, the autonomous device 120 may include one or more displays, one or more speakers, one or more projectors, and/or any type of output devices that allow the autonomous device 120 to communicate information to a nearby user. The one or more projectors may include projectors that project a two-dimensional image onto a surface (e.g., wall, floor, or ceiling) and/or holographic projectors that project three-dimensional holograms into a nearby space.

The autonomous device 120 also may include a communication module that enables the autonomous device 120 to communicate other devices of the system 100. The communication module may be a wireless communication module that allows the autonomous device 120 to communicate wirelessly. For instance, the communication module may be a Wi-Fi module that enables the autonomous device 120 to communicate over a local wireless network at the property. The communication module further may be a 900 MHz wireless communication module that enables the autonomous device 120 to communicate directly with the monitor control unit 110. Other types of short-range wireless communication protocols, such as Bluetooth, Bluetooth LE, Z-wave, ZigBee, etc., may be used to allow the autonomous device 120 to communicate with other devices in the property.

The autonomous device 120 further may include processing and storage capabilities. The autonomous device 120 may include any suitable processing devices that enable the autonomous device 120 to operate applications and perform the actions described throughout this disclosure. In addition, the autonomous device 120 may include solid state electronic storage that enables the autonomous device 120 to store applications, configuration data, collected sensor data, and/or any other type of information available to the autonomous device 120.

The autonomous device 120 may be associated with a charging station 121. The charging station 121 may be located at a predefined or reference location within a property. The autonomous device 120 may be configured to navigate to the charging station 121 after successfully performing a particular specified action. For instance, after completing the specified action upon instruction by the monitor control unit 110, the autonomous device 120 may be configured to automatically fly to and land on one of the charging station 121. In this regard, the autonomous device 120 may automatically maintain a fully charged battery in a state in which the autonomous device 120 are ready for use by the system 100.

The charging station 121 may be a contact-based charging stations and/or wireless charging stations. For contact based charging stations, the autonomous device 120 may have readily accessible points of contact that the autonomous device 120 are capable of positioning and mating with a corresponding contact on the charging station 121. For instance, a helicopter type robotic device may have an electronic contact on a portion of its landing gear that rests on and mates with an electronic pad of a charging station 121 when the helicopter type robotic device lands on the charging station 121. The electronic contact on the robotic device may include a cover that opens to expose the electronic contact when the robotic device is charging and closes to cover and insulate the electronic contact when the robotic device is in operation.

In some implementations, the autonomous device 120 may dock to the charging station 121 close to or on the ceiling, where the autonomous device 120 may be equipped with one or more lenses (e.g., 180° field-of-view (FOV) lens) on a bottom surface. When the charging station 121 is mounted to a ceiling, or on a bottom or side surface near a wall, the drone may function as a stationary surveillance camera. As the mounted charging station 121 is powered, the autonomous device 120 may operate as a camera continuously, providing significant additional utility.

In some implementations, the charging station 121 may include a docking arm that mounts to a wall and extends out from the wall, such that the autonomous device 120 may dock to either below, at the end of, or on top of the arm. While docked, power would be passed from the arm of the charging station 121 to the autonomous device 120 either through an inductive charging circuit or through mechanical electrical pin contacts or other such surfaces mating with conductive plates or other such electrically conductive surfaces. The pins and plates may be located alternatively on either the arm or the autonomous device 120. The arm receives power via a cable connected to a power supply that is located down the wall at a receptacle. In some other implementations, there is a ceiling dock that is installed in an electrical ceiling junction box. Instead of an arm, the autonomous device 120 is mounted to the assembly directly. Power would be supplied to the mount system via building wiring and converted to DC in the mount.

In some implementations, the charging station 121 and the autonomous device 120 are coupled in a manner which can be remotely triggered to engage or disengage such that the autonomous device 120 can separate from the charging station 121 to capture video in other locations or to perform other tasks. The charging station 121 may include an electromagnetic apparatus whereby the dock has a rare earth magnet combined with an electromagnet such that when the electromagnet is energized it creates a magnet force where the poles of the magnetic field are aligned in an orientation that reroutes the magnetic field of the rare earth magnet such that magnetic force is reduced or cancelled. The autonomous device 120 may be constructed with a ferrous metal plate such that when the autonomous device 120 comes in close proximity to the rare earth magnet in the docking system, the autonomous device 120 becomes affixed to the arm. When the electromagnet in the charging station 121 is energized, the magnetic field of the dock is effectively cancelled resulting in inadequate magnetic force to hold the weight of the drone such that the autonomous device 120 may disengage from the charging station 121 and can begin to fly. In the event that power is removed from the charging station 121, the autonomous device 120 would remain affixed to the charging system 121.

In some implementations, and considering that the autonomous device 120 has an onboard power source (batteries), the autonomous device 120 and the charging station 121 may be coupled mechanically. When the autonomous device 120 positions itself in proper proximity to the mechanical coupling mechanism and then engages with the mechanism such that one element of the mechanism inserts into another on the charging station 121 in a manner that captures the autonomous device 120 to overcome the force of gravity on the autonomous device 120, the autonomous device 120 is temporarily affixed to the charging station 121. Using its onboard power, the autonomous device 120 can operate a mechanically actuated release mechanism causing the autonomous device 120 to disengage from the charging station 121 to fly away from the charging station 121. As long as the autonomous device 120 has power, the autonomous device 120 may disengage from the charging station 121, even if the charging station 121 experiences a loss of power.

The system 100 may also include one or more sensors or detectors. For example, the system 100 may include multiple sensors 132. The sensors 132 may include a contact sensor, a motion sensor, a glass break sensor, or any other type of sensor included in an alarm system or security system. The sensors 132 also may include an environmental sensor, such as a temperature sensor, a water sensor, a rain sensor, a wind sensor, a light sensor, a smoke detector, a carbon monoxide detector, an air quality sensor, etc. The sensors 132 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 132 may include a radio-frequency identification (RFID) sensor that identifies a particular article that includes a pre-assigned RFID tag.

In some implementations, the sensors 132 may include one or more cameras. The cameras may be video/photographic cameras or other type of optical sensing devices configured to capture images. For instance, the cameras may be configured to capture images of an area within a building monitored by the monitor control unit 110. The cameras may be configured to capture single, static images of the area and also video images of the area in which multiple images of the area are captured at a relatively high frequency (e.g., thirty images per second). The cameras may be controlled based on commands received from the monitor control unit 110.

The appliances 134 may be home automation devices connected to the network 105 that are configured to exchange electronic communications with other devices of the system 100. The appliances 134 may include, for example, connected kitchen appliances, controllable light sources, safety and security devices, energy management devices, and/or other types of electronic devices capable of exchanging electronic communications over the network 105. In some instances, the appliances 134 may periodically transmit information and/or generated data to the monitor control unit 110 such that the monitor control unit 110 can automatically control the operation of the appliances 134 based on the exchanged communications. For example, the monitor control unit 110 may operate one or more of the appliances 134 based on a fixed schedule specified by the user. In another example, the monitor control unit 110 may enable or disable one or more of the appliances 134 based on received sensor data from the sensors 132.

The user device 140 may be any type of personal electronic computing device that is associated with a property management company that operates the application server 150. The user device 140 may be one or more of a cellular telephone, smartphone, a tablet-computing device, a laptop computing device, a desktop computing device, a wearable device, or any other type of network-enabled electronic device.

The user device 140 may include a native application that enables communications with devices located within the property 101 through the application server 150. The native application refers to software/firmware programs running on the user device 140 that enable various features. For instance, the user device 140 may load or install the native application based on data received over a network 105 or data received from local media. The native application may run on various mobile device platforms associated with the user device 140.

In some implementations, the native application of the user device 140 identifies a geographic location associated with the user device 140 and communicates information identifying the geographic location. For example, the user device 140 having the native application may determine a geographic location of the user device 140 using GPS capabilities, and may communicate data identifying the geographic location to the application server 150. In some instances, the native application may check the location of the user device 140 periodically and may detect when a user is presently located inside or outside a property. The autonomous device 120 to determine the region of the property where the user is located within the property can then use location data associated with the user device 140.

Additionally, or alternatively, the user device 140 may communicate with the monitor control unit 110 and/or the autonomous device 120 using various local wireless protocols, such as Wi-Fi, Bluetooth, Z-Wave, ZigBee, Home Plug, HPAV, HPAV2, G.hn (Ethernet over power line), or wired protocols such as Ethernet, USB, and other wired protocols based on the RS232, RS485, and/or RS422 standards.

The application server 150 may be an electronic device configured to provide monitoring services for the property 101. The application server 150 may exchange electronic communications with the monitor control unit 110, the autonomous device 120, the sensors 132, the appliances 134, and the user device 140 over the network 105. For example, the application server 150 may obtain and store the property condition data 122 within the repository 152 to maintain a historical rental and/or maintenance record associated with the property 101.

In some implementations, the application server 150 is operated and/or maintained by, for example, a property management company that manages property rentals for multiple properties including the property 101. For example, the application server 150 may be associated with rental management system (e.g., through a web page or through a mobile application) that enables prospective occupants to make a rental selection of a property that is made available by the property management company. In such implementations, the user 102 can be an employee of the rental management company that inspects and/or performs an inspection of the property 101 prior to the start of a rental period, or after the termination of a rental period.

Alternatively, in other implementations, the application server 150 may instead by operated and/or maintained by a third party that is distinct from the property management company but otherwise has access to rental data associated with the property 101 (e.g., data included within the repository 152). In such implementations, the application server 152 may obtain property information from a system of the property management company for storage within the repository 152.

The application server 150 may be configured to monitor events (e.g., alarm events, emergency conditions, etc.) generated by the monitor control unit 110 and/or the autonomous device 120. For example, the application server 150 may exchange electronic communications with the network module included in the monitor control unit 110 to receive information regarding events (e.g., fire, carbon monoxide) detected by the monitor control unit 110. The application server 150 also may receive information regarding events (e.g., alarm events) from the autonomous device 120.

The application server 150 may also store sensor and image data received from the system 100 and perform analysis of sensor and image data received from the system 100. Based on the analysis, the application server 150 may communicate with and control aspects of the monitor control unit 110, the autonomous device 120, or the user device 140. In addition, the application server 150 may store dynamic object data (e.g., based on sensor data collected by the sensors 132), or information associated with dynamic object data (e.g., historical status information associated with dynamic objects). The application server 150 may also store data associated with the dynamic multi-dimensional spatial representations that are determined for the property 101. For example, the application server 150 may store historical data associated with previously generated spatial representations of the property 101 over a specified period of time.

Figure 2:
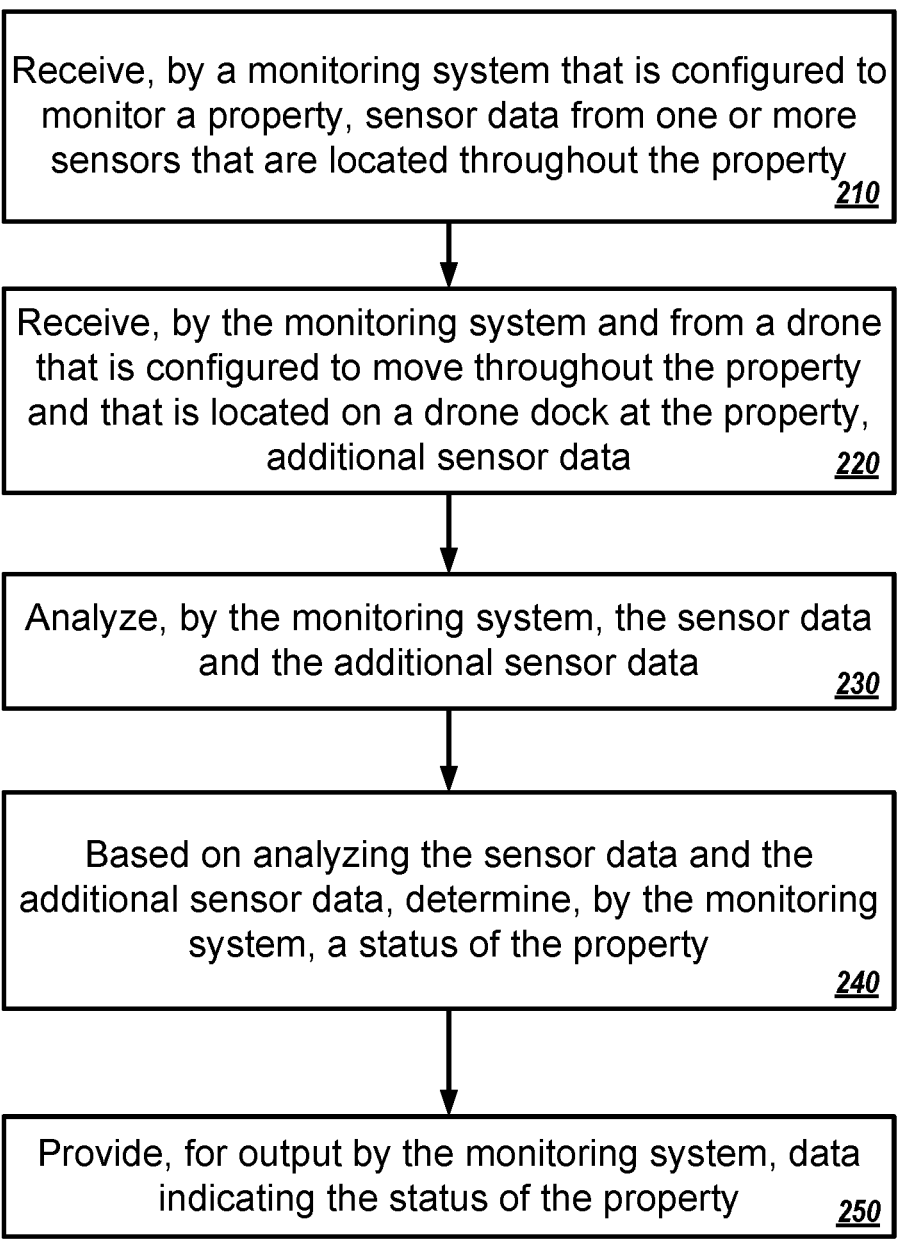
FIG. 2 is a flowchart of an example process of using a docked autonomous device as a camera.

FIG. 2 is a flowchart of an example process 200 of using a docked autonomous device as a camera. The operations of the process 200 are described generally as being performed by the monitoring system 100 of FIG. 1. In some implementations, the operations of the process 200 may be performed by any combination of one of more computing devices, for example, the control unit 110, the autonomous device 120, or the application server 150.

The system receives sensor data from one or more sensors that are located throughout the property (210). The system may be a monitoring system that is configured to monitor a property. The sensors may be cameras, motion detectors, infrared sensors, microphones, thermometers, or any other type of sensor that collects data related to the area inside and surrounding the property. In some implementations, the sensors may be stationary.

The system receives, from a drone that is configured to move throughout the property and that is located on a drone dock at the property, additional sensor data (220). The drone, or autonomous device, may be a quadcopter type drone that is configured to fly around the property or may be a device that moves along the ground. The drone may include one or more sensors such as cameras, motion detectors, infrared sensors, microphones, thermometers, or any other type of sensor. The drone may collect data using the sensors while moving around the property.

The system may include a drone dock, or charging station, that is configured to act as a home base for the drone. The drone dock may charge the drone while the drone is docked. The drone dock may be able to mechanically or magnetically couple to the drone. The drone dock may be located on a ceiling or a wall so that the drone may be able to fly from below the drone dock and connect the top of the drone to the drone dock. While docked, the drone may act as a stationary sensor and collect sensor data as a camera, motion detector, infrared sensor, microphone, thermometer, or any other type of sensor would if it were installed at the location of the drone dock.

In some implementations, the system may include multiple drone docks that are located throughout the property. When the drone connects to a particular dock, the drone may communicate to the system which dock the drone is connected to. For example, the drone may connect to a dock in the living room. The drone may transmit sensor data to the system while connected to the dock in the living room along with data indicating that the drone is docked to the living room dock. The drone may transmit data indicating that the drone is connected to a garage dock if the drone is connected to a dock in the garage.

In some implementations, the drone may be running low on batter power. The battery power may be low enough that the drone may not be able to reach each of the docks at the property. The drone may identify the dock that is closest to the drone and navigate to that dock. In some implementations, the drone may rotate which dock the drone uses. For example, the drone may be located at the living room dock, then travel around the property and dock at the garage dock. The drone may return to the living room dock after leaving the garage dock and traveling around the property.

In some implementations, the system may instruct the drone to navigate to a particular dock. For example, the system may determine that there is unusual activity in the garage. The system may include a motion detector but not a camera in the garage. The system may instruct the drone to navigate to the garage and dock at the garage dock. In some implementations, the system may instruct the drone to navigate to a particular dock based on an armed status of the property. For example, if the system is unarmed, the system may instruct the drone to dock at the dock that has a view of the front yard. This may assist the system in determining when a visitor has arrived at the property. The drone may still occasionally move around and survey the property, but the drone will return to the dock that has a view of the front yard until instructed otherwise by the system. As another example, if the system is armed stay, then the system may instruct the drone to use the dock in the living room. If the system is armed away, then the system may instruct the drone to use the upstairs dock.

The system analyzes the sensor data and the additional sensor data (230). The system may receive the sensor data from the stationary sensors and the additional sensor data from the drone while the drone is docked or while the drone is traveling. The system may analyze the sensor data and the additional sensor data for any signs of suspicious activity. For example, the system may analyze the sensor data for the sound of glass breaking, motion in the kitchen when nobody is home, or any other suspicious activity.

The system, based on analyzing the sensor data and the additional sensor data, determines a status of the property (240). The system may determine whether to generate a notification or initiate an alarm event based on the sensor data and the additional sensor data. The system may also use the location of the dock where the drone was located when the drone generated the additional sensor data when analyzing the sensor data and the additional sensor data.

The system provides, for output, data indicating the status of the property. (250). The system may generate an audible alarm in instances where the system identifies an alarm event based on the sensor data and the additional sensor data. The system may output a notification to a resident of the property in instances where the system may not identify an alarm event and instead identifies possible suspicious activity.

Figure 3:
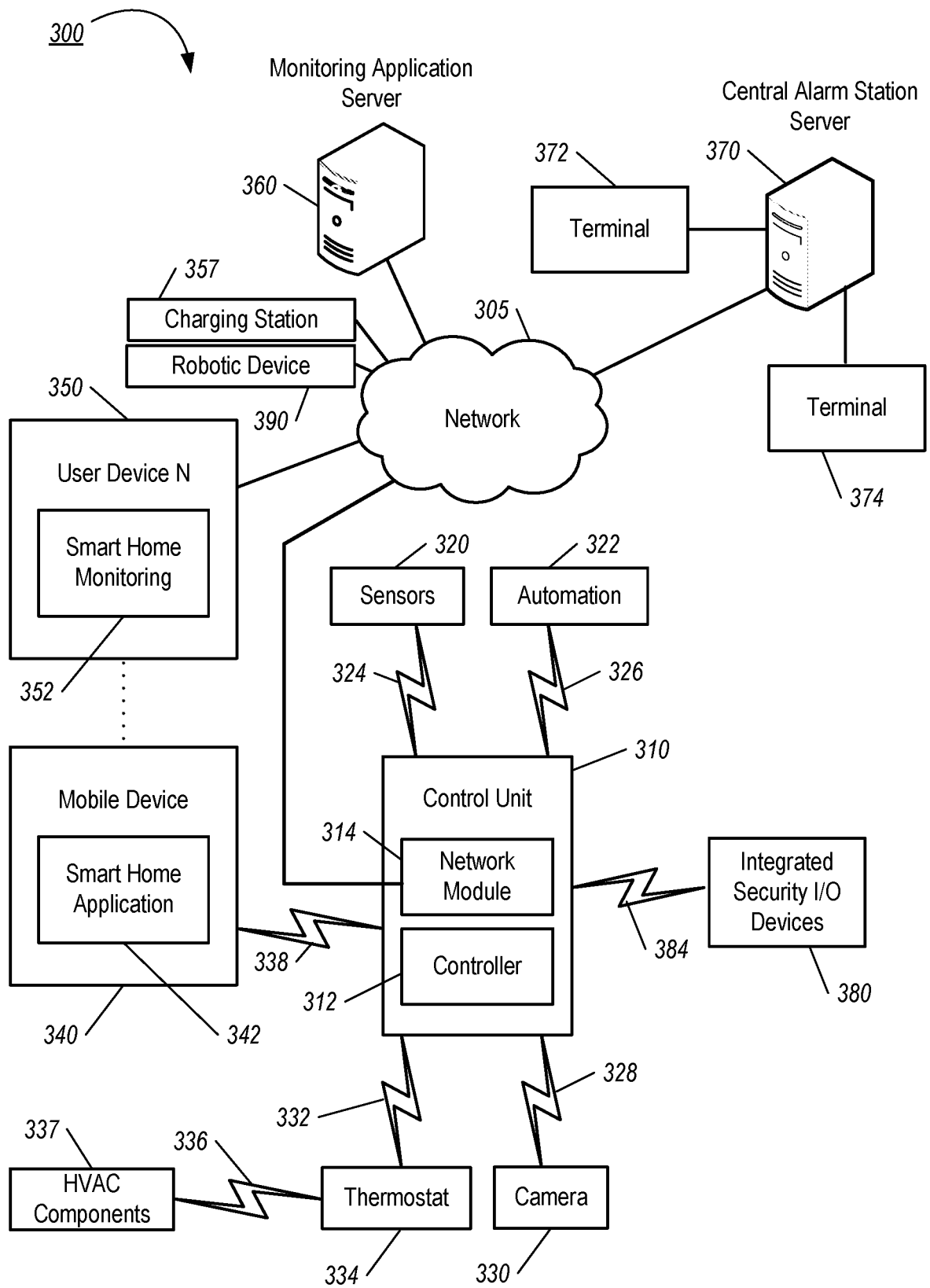
FIG. 3 illustrates an example monitoring system.

FIG. 3 is a diagram illustrating an example of a home monitoring system 300. The electronic system 300 includes a network 305, a monitor control unit 310, one or more user devices 340 and 350, a monitoring server 360, and a central alarm station server 370. In some examples, the network 305 facilitates communications between the control unit 310, the one or more user devices 340 and 350, the monitoring server 360, and the central alarm station server 370.

The network 305 is configured to enable exchange of electronic communications between devices connected to the network 305. For example, the network 305 may be configured to enable exchange of electronic communications between the control unit 310, the one or more user devices 340 and 350, the monitoring server 360, and the central alarm station server 370. The network 305 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 305 may include multiple networks or subnetworks, each of which may include, for example, a wired or wireless data pathway. The network 305 may include a circuit-switched network, a packet-switched data network, or any other network able to carry electronic communications (e.g., data or voice communications). For example, the network 305 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 305 may include one or more networks that include wireless data channels and wireless voice channels. The network 305 may be a wireless network, a broadband network, or a combination of networks including a wireless network and a broadband network.

The control unit 310 includes a controller 312 and a network module 314. The controller 312 is configured to control a control unit monitoring system (e.g., a control unit system) that includes the control unit 310. In some examples, the controller 312 may include a processor or other control circuitry configured to execute instructions of a program that controls operation of a control unit system. In these examples, the controller 312 may be configured to receive input from sensors, flow meters, or other devices included in the control unit system and control operations of devices included in the household (e.g., speakers, lights, doors, etc.). For example, the controller 312 may be configured to control operation of the network module 314 included in the control unit 310.

The network module 314 is a communication device configured to exchange communications over the network 305. The network module 314 may be a wireless communication module configured to exchange wireless communications over the network 305. For example, the network module 314 may be a wireless communication device configured to exchange communications over a wireless data channel and a wireless voice channel. In this example, the network module 314 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 314 also may be a wired communication module configured to exchange communications over the network 305 using a wired connection. For instance, the network module 314 may be a modem, a network interface card, or another type of network interface device. The network module 314 may be an Ethernet network card configured to enable the control unit 310 to communicate over a local area network and/or the Internet. The network module 314 also may be a voice band modem configured to enable the alarm panel to communicate over the telephone lines of Plain Old Telephone Systems (POTS).

The control unit system that includes the control unit 310 includes one or more sensors. For example, the monitoring system may include multiple sensors 320. The sensors 320 may include a lock sensor, a contact sensor, a motion sensor, or any other type of sensor included in a control unit system. The sensors 320 also may include an environmental sensor, such as a temperature sensor, a water sensor, a rain sensor, a wind sensor, a light sensor, a smoke detector, a carbon monoxide detector, an air quality sensor, etc. The sensors 320 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health monitoring sensor can be a wearable sensor that attaches to a user in the home. The health monitoring sensor can collect various health data, including pulse, heart-rate, respiration rate, sugar or glucose level, bodily temperature, or motion data.

The sensors 320 can also include a radio-frequency identification (RFID) sensor that identifies a particular article that includes a pre-assigned RFID tag.

The control unit 310 communicates with the home automation controls 322 and a camera 330 to perform monitoring. The home automation controls 322 are connected to one or more devices that enable automation of actions in the home. For instance, the home automation controls 322 may be connected to one or more lighting systems and may be configured to control operation of the one or more lighting systems. Also, the home automation controls 322 may be connected to one or more electronic locks at the home and may be configured to control operation of the one or more electronic locks (e.g., control Z-Wave locks using wireless communications in the Z-Wave protocol). Further, the home automation controls 322 may be connected to one or more appliances at the home and may be configured to control operation of the one or more appliances. The home automation controls 322 may include multiple modules that are each specific to the type of device being controlled in an automated manner. The home automation controls 322 may control the one or more devices based on commands received from the control unit 310. For instance, the home automation controls 322 may cause a lighting system to illuminate an area to provide a better image of the area when captured by a camera 330.

The camera 330 may be a video/photographic camera or other type of optical sensing device configured to capture images. For instance, the camera 330 may be configured to capture images of an area within a building or home monitored by the control unit 310. The camera 330 may be configured to capture single, static images of the area and also video images of the area in which multiple images of the area are captured at a relatively high frequency (e.g., thirty images per second). The camera 330 may be controlled based on commands received from the control unit 310.

The camera 330 may be triggered by several different types of techniques. For instance, a Passive Infra-Red (PIR) motion sensor may be built into the camera 330 and used to trigger the camera 330 to capture one or more images when motion is detected. The camera 330 also may include a microwave motion sensor built into the camera and used to trigger the camera 330 to capture one or more images when motion is detected. The camera 330 may have a "normally open" or "normally closed" digital input that can trigger capture of one or more images when external sensors (e.g., the sensors 320, PIR, door/window, etc.) detect motion or other events. In some implementations, the camera 330 receives a command to capture an image when external devices detect motion or another potential alarm event. The camera 330 may receive the command from the controller 312 or directly from one of the sensors 320.

In some examples, the camera 330 triggers integrated or external illuminators (e.g., Infra-Red, Z-wave controlled "white" lights, lights controlled by the home automation controls 322, etc.) to improve image quality when the scene is dark. An integrated or separate light sensor may be used to determine if illumination is desired and may result in increased image quality.

The camera 330 may be programmed with any combination of time/day schedules, system "arming state", or other variables to determine whether images should be captured or not when triggers occur. The camera 330 may enter a low-power mode when not capturing images. In this case, the camera 330 may wake periodically to check for inbound messages from the controller 312. The camera 330 may be powered by internal, replaceable batteries if located remotely from the control unit 310. The camera 330 may employ a small solar cell to recharge the battery when light is available. Alternatively, the camera 330 may be powered by the controller's 312 power supply if the camera 330 is co-located with the controller 312.

In some implementations, the camera 330 communicates directly with the monitoring server 360 over the Internet. In these implementations, image data captured by the camera 330 does not pass through the control unit 310 and the camera 330 receives commands related to operation from the monitoring server 360.

The system 300 also includes thermostat 334 to perform dynamic environmental control at the home. The thermostat 334 is configured to monitor temperature and/or energy consumption of an HVAC system associated with the thermostat 334, and is further configured to provide control of environmental (e.g., temperature) settings. In some implementations, the thermostat 334 can additionally or alternatively receive data relating to activity at a home and/or environmental data at a home, e.g., at various locations indoors and outdoors at the home. The thermostat 334 can directly measure energy consumption of the HVAC system associated with the thermostat, or can estimate energy consumption of the HVAC system associated with the thermostat 334, for example, based on detected usage of one or more components of the HVAC system associated with the thermostat 334. The thermostat 334 can communicate temperature and/or energy monitoring information to or from the control unit 310 and can control the environmental (e.g., temperature) settings based on commands received from the control unit 310.

In some implementations, the thermostat 334 is a dynamically programmable thermostat and can be integrated with the control unit 310. For example, the dynamically programmable thermostat 334 can include the control unit 310, e.g., as an internal component to the dynamically programmable thermostat 334. In addition, the control unit 310 can be a gateway device that communicates with the dynamically programmable thermostat 334. In some implementations, the thermostat 334 is controlled via one or more home automation controls 322.

A module 337 is connected to one or more components of an HVAC system associated with a home, and is configured to control operation of the one or more components of the HVAC system. In some implementations, the module 337 is also configured to monitor energy consumption of the HVAC system components, for example, by directly measuring the energy consumption of the HVAC system components or by estimating the energy usage of the one or more HVAC system components based on detecting usage of components of the HVAC system. The module 337 can communicate energy monitoring information and the state of the HVAC system components to the thermostat 334 and can control the one or more components of the HVAC system based on commands received from the thermostat 334.

In some examples, the system 300 further includes one or more robotic devices 390 which may be referred to as drones or autonomous devices similar and may be similar to the autonomous device 120 described in FIG. 1. The robotic devices 390 may be any type of robots that are capable of moving and taking actions that assist in home monitoring. For example, the robotic devices 390 may include drones that are capable of moving throughout a home based on automated control technology and/or user input control provided by a user. In this example, the drones may be able to fly, roll, walk, or otherwise move about the home. The drones may include helicopter type devices (e.g., quad copters), rolling helicopter type devices (e.g., roller copter devices that can fly and also roll along the ground, walls, or ceiling) and land vehicle type devices (e.g., automated cars that drive around a home). In some cases, the robotic devices 390 may be robotic devices 390 that are intended for other purposes and merely associated with the system 300 for use in appropriate circumstances. For instance, a robotic vacuum cleaner device may be associated with the monitoring system 300 as one of the robotic devices 390 and may be controlled to take action responsive to monitoring system events.

In some examples, the robotic devices 390 automatically navigate within a home. In these examples, the robotic devices 390 include sensors and control processors that guide movement of the robotic devices 390 within the home. For instance, the robotic devices 390 may navigate within the home using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 390 may include control processors that process output from the various sensors and control the robotic devices 390 to move along a path that reaches the desired destination and avoids obstacles. In this regard, the control processors detect walls or other obstacles in the home and guide movement of the robotic devices 390 in a manner that avoids the walls and other obstacles.

In addition, the robotic devices 390 may store data that describes attributes of the home. For instance, the robotic devices 390 may store a floorplan and/or a three-dimensional model of the home that enables the robotic devices 390 to navigate the home. During initial configuration, the robotic devices 390 may receive the data describing attributes of the home, determine a frame of reference to the data (e.g., a home or reference location in the home), and navigate the home based on the frame of reference and the data describing attributes of the home. Further, initial configuration of the robotic devices 390 also may include learning of one or more navigation patterns in which a user provides input to control the robotic devices 390 to perform a specific navigation action (e.g., fly to an upstairs bedroom and spin around while capturing video and then return to a home charging base). In this regard, the robotic devices 390 may learn and store the navigation patterns such that the robotic devices 390 may automatically repeat the specific navigation actions upon a later request.

In some examples, the robotic devices 390 may include data capture and recording devices. In these examples, the robotic devices 390 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the home and users in the home. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices 390 to take and store a biometric sample that can be used to identify the person (e.g., a biometric sample with DNA that can be used for DNA testing).

In some implementations, the robotic devices 390 may include output devices. In these implementations, the robotic devices 390 may include one or more displays, one or more speakers, and/or any type of output devices that allow the robotic devices 390 to communicate information to a nearby user.

The robotic devices 390 also may include a communication module that enables the robotic devices 390 to communicate with the control unit 310, each other, and/or other devices. The communication module may be a wireless communication module that allows the robotic devices 390 to communicate wirelessly. For instance, the communication module may be a Wi-Fi module that enables the robotic devices 390 to communicate over a local wireless network at the home. The communication module further may be a 900 MHz wireless communication module that enables the robotic devices 390 to communicate directly with the control unit 310. Other types of short-range wireless communication protocols, such as Bluetooth, Bluetooth LE, Z-wave, Zigbee, etc., may be used to allow the robotic devices 390 to communicate with other devices in the home. In some implementations, the robotic devices 390 may communicate with each other or with other devices of the system 300 through the network 305.

The robotic devices 390 further may include processor and storage capabilities. The robotic devices 390 may include any suitable processing devices that enable the robotic devices 390 to operate applications and perform the actions described throughout this disclosure. In addition, the robotic devices 390 may include solid state electronic storage that enables the robotic devices 390 to store applications, configuration data, collected sensor data, and/or any other type of information available to the robotic devices 390.

The robotic devices 390 are associated with one or more charging stations 357. The charging stations 357 may be similar to the charging station 121 described in FIG. 1. The charging stations 357 may be located at predefined home base or reference locations in the home. The robotic devices 390 may be configured to navigate to the charging stations 357 after completion of tasks needed to be performed for the monitoring system 300. For instance, after completion of a monitoring operation or upon instruction by the control unit 310, the robotic devices 390 may be configured to automatically fly to and land on one of the charging stations 357. In this regard, the robotic devices 390 may automatically maintain a fully charged battery in a state in which the robotic devices 390 are ready for use by the monitoring system 300.

The charging stations 357 may be contact based charging stations and/or wireless charging stations. For contact based charging stations 357, the robotic devices 390 may have readily accessible points of contact that the robotic devices 390 are capable of positioning and mating with a corresponding contact on the charging station 357. For instance, a helicopter type robotic device may have an electronic contact on a portion of its landing gear that rests on and mates with an electronic pad of a charging station 357 when the helicopter type robotic device lands on the charging station 357. The electronic contact on the robotic device may include a cover that opens to expose the electronic contact when the robotic device is charging and closes to cover and insulate the electronic contact when the robotic device is in operation.

For wireless charging stations 357, the robotic devices 390 may charge through a wireless exchange of power. In these cases, the robotic devices 390 need only locate themselves closely enough to the wireless charging stations 357 for the wireless exchange of power to occur. In this regard, the positioning needed to land at a predefined home base or reference location in the home may be less precise than with a contact based charging station 357. Based on the robotic devices 390 landing at a wireless charging station 357, the wireless charging station 357 outputs a wireless signal that the robotic devices 390 receive and convert to a power signal that charges a battery maintained on the robotic devices 390.

In some implementations, each of the robotic devices 390 has a corresponding and assigned charging station 357 such that the number of robotic devices 390 equals the number of charging stations. In these implementations, the robotic devices 390 always navigate to the specific charging station assigned to that robotic device. For instance, a first robotic device may always use a first charging station and a second robotic device may always use a second charging station.

In some examples, the robotic devices 390 may share charging stations 357. For instance, the robotic devices 390 may use one or more community charging stations 357 that are capable of charging multiple robotic devices 390. The community charging station may be configured to charge multiple robotic devices 390 in parallel. The community charging station may be configured to charge multiple robotic devices 390 in serial such that the multiple robotic devices 390 take turns charging and, when fully charged, return to a predefined home base or reference location in the home that is not associated with a charger. The number of community charging stations may be less than the number of robotic devices 390.

Also, the charging stations 357 may not be assigned to specific robotic devices 390 and may be capable of charging any of the robotic devices 390. In this regard, the robotic devices 390 may use any suitable, unoccupied charging station when not in use. For instance, when one of the robotic devices 390 has completed an operation or is in need of battery charge, the control unit 310 references a stored table of the occupancy status of each charging station 357 and instructs the robotic device to navigate to the nearest charging station 357 that is unoccupied.

The system 300 further includes one or more integrated security devices 380. The one or more integrated security devices may include any type of device used to provide alerts based on received sensor data. For instance, the one or more control units 310 may provide one or more alerts to the one or more integrated security input/output devices 380. Additionally, the one or more control units 310 may receive one or more sensor data from the sensors 320 and determine whether to provide an alert to the one or more integrated security input/output devices 380.

The sensors 320, the home automation controls 322, the camera 330, the thermostat 334, and the integrated security devices 380 may communicate with the controller 312 over communication links 324, 326, 328, 332, 338, and 384. The communication links 324, 326, 328, 332, 338, and 384 may be a wired or wireless data pathway configured to transmit signals from the sensors 320, the home automation controls 322, the camera 330, the thermostat 334, and the integrated security devices 380 to the controller 312. The sensors 320, the home automation controls 322, the camera 330, the thermostat 334, and the integrated security devices 380 may continuously transmit sensed values to the controller 312, periodically transmit sensed values to the controller 312, or transmit sensed values to the controller 312 in response to a change in a sensed value.

The communication links 324, 326, 328, 332, 338, and 384 may include a local network. The sensors 320, the home automation controls 322, the camera 330, the thermostat 334, and the integrated security devices 380, and the controller 312 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring server 360 is an electronic device configured to provide monitoring services by exchanging electronic communications with the control unit 310, the one or more user devices 340 and 350, and the central alarm station server 370 over the network 305. For example, the monitoring server 360 may be configured to monitor events (e.g., alarm events) generated by the control unit 310. In this example, the monitoring server 360 may exchange electronic communications with the network module 314 included in the control unit 310 to receive information regarding events (e.g., alerts) detected by the control unit 310. The monitoring server 360 also may receive information regarding events (e.g., alerts) from the one or more user devices 340 and 350.

In some examples, the monitoring server 360 may route alert data received from the network module 314 or the one or more user devices 340 and 350 to the central alarm station server 370. For example, the monitoring server 360 may transmit the alert data to the central alarm station server 370 over the network 305.

The monitoring server 360 may store sensor and image data received from the monitoring system and perform analysis of sensor and image data received from the monitoring system. Based on the analysis, the monitoring server 360 may communicate with and control aspects of the control unit 310 or the one or more user devices 340 and 350.

The monitoring server 360 may provide various monitoring services to the system 300. For example, the monitoring server 360 may analyze the sensor, image, and other data to determine an activity pattern of a resident of the home monitored by the system 300. In some implementations, the monitoring server 360 may analyze the data for alarm conditions or may determine and perform actions at the home by issuing commands to one or more of the controls 322, possibly through the control unit 310.

The central alarm station server 370 is an electronic device configured to provide alarm monitoring service by exchanging communications with the control unit 310, the one or more mobile devices 340 and 350, and the monitoring server 360 over the network 305. For example, the central alarm station server 370 may be configured to monitor alerting events generated by the control unit 310. In this example, the central alarm station server 370 may exchange communications with the network module 314 included in the control unit 310 to receive information regarding alerting events detected by the control unit 310. The central alarm station server 370 also may receive information regarding alerting events from the one or more mobile devices 340 and 350 and/or the monitoring server 360.

The central alarm station server 370 is connected to multiple terminals 372 and 374. The terminals 372 and 374 may be used by operators to process alerting events. For example, the central alarm station server 370 may route alerting data to the terminals 372 and 374 to enable an operator to process the alerting data. The terminals 372 and 374 may include general-purpose computers (e.g., desktop personal computers, workstations, or laptop computers) that are configured to receive alerting data from a server in the central alarm station server 370 and render a display of information based on the alerting data. For instance, the controller 312 may control the network module 314 to transmit, to the central alarm station server 370, alerting data indicating that a sensor 320 detected motion from a motion sensor via the sensors 320. The central alarm station server 370 may receive the alerting data and route the alerting data to the terminal 372 for processing by an operator associated with the terminal 372. The terminal 372 may render a display to the operator that includes information associated with the alerting event (e.g., the lock sensor data, the motion sensor data, the contact sensor data, etc.) and the operator may handle the alerting event based on the displayed information.

In some implementations, the terminals 372 and 374 may be mobile devices or devices designed for a specific function. Although FIG. 3 illustrates two terminals for brevity, actual implementations may include more (and, perhaps, many more) terminals.

The one or more authorized user devices 340 and 350 are devices that host and display user interfaces. For instance, the user device 340 is a mobile device that hosts or runs one or more native applications (e.g., the smart home application 342). The user device 340 may be a cellular phone or a non-cellular locally networked device with a display. The user device 340 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 340 may perform functions unrelated to the monitoring system, such as placing personal telephone calls, playing music, playing video, displaying pictures, browsing the Internet, maintaining an electronic calendar, etc.

The user device 340 includes a smart home application 342. The smart home application 342 refers to a software/firmware program running on the corresponding mobile device that enables the user interface and features described throughout. The user device 340 may load or install the smart home application 342 based on data received over a network or data received from local media. The smart home application 342 runs on mobile devices platforms, such as iPhone, iPod touch, Blackberry, Google Android, Windows Mobile, etc. The smart home application 342 enables the user device 340 to receive and process image and sensor data from the monitoring system.

The user device 350 may be a general-purpose computer (e.g., a desktop personal computer, a workstation, or a laptop computer) that is configured to communicate with the monitoring server 360 and/or the control unit 310 over the network 305. The user device 350 may be configured to display a smart home user interface 352 that is generated by the user device 350 or generated by the monitoring server 360. For example, the user device 350 may be configured to display a user interface (e.g., a web page) provided by the monitoring server 360 that enables a user to perceive images captured by the camera 330 and/or reports related to the monitoring system. Although FIG. 3 illustrates two user devices for brevity, actual implementations may include more (and, perhaps, many more) or fewer user devices.

In some implementations, the one or more user devices 340 and 350 communicate with and receive monitoring system data from the control unit 310 using the communication link 338. For instance, the one or more user devices 340 and 350 may communicate with the control unit 310 using various local wireless protocols such as Wi-Fi, Bluetooth, Z-wave, Zigbee, HomePlug (ethernet over power line), or wired protocols such as Ethernet and USB, to connect the one or more user devices 340 and 350 to local security and automation equipment. The one or more user devices 340 and 350 may connect locally to the monitoring system and its sensors and other devices. The local connection may improve the speed of status and control communications because communicating through the network 305 with a remote server (e.g., the monitoring server 360) may be significantly slower.

Although the one or more user devices 340 and 350 are shown as communicating with the control unit 310, the one or more user devices 340 and 350 may communicate directly with the sensors and other devices controlled by the control unit 310. In some implementations, the one or more user devices 340 and 350 replace the control unit 310 and perform the functions of the control unit 310 for local monitoring and long range/offsite communication.

In other implementations, the one or more user devices 340 and 350 receive monitoring system data captured by the control unit 310 through the network 305. The one or more user devices 340, 350 may receive the data from the control unit 310 through the network 305 or the monitoring server 360 may relay data received from the control unit 310 to the one or more user devices 340 and 350 through the network 305. In this regard, the monitoring server 360 may facilitate communication between the one or more user devices 340 and 350 and the monitoring system.

In some implementations, the one or more user devices 340 and 350 may be configured to switch whether the one or more user devices 340 and 350 communicate with the control unit 310 directly (e.g., through link 338) or through the monitoring server 360 (e.g., through network 305) based on a location of the one or more user devices 340 and 350. For instance, when the one or more user devices 340 and 350 are located close to the control unit 310 and in range to communicate directly with the control unit 310, the one or more user devices 340 and 350 use direct communication. When the one or more user devices 340 and 350 are located far from the control unit 310 and not in range to communicate directly with the control unit 310, the one or more user devices 340 and 350 use communication through the monitoring server 360.

Although the one or more user devices 340 and 350 are shown as being connected to the network 305, in some implementations, the one or more user devices 340 and 350 are not connected to the network 305. In these implementations, the one or more user devices 340 and 350 communicate directly with one or more of the monitoring system components and no network (e.g., Internet) connection or reliance on remote servers is needed.

In some implementations, the one or more user devices 340 and 350 are used in conjunction with only local sensors and/or local devices in a house. In these implementations, the system 300 includes the one or more user devices 340 and 350, the sensors 320, the home automation controls 322, the camera 330, the robotic devices 390, and the charging station 357. The one or more user devices 340 and 350 receive data directly from the sensors 320, the home automation controls 322, the camera 330, the robotic devices 390, and the charging station 357 and sends data directly to the sensors 320, the home automation controls 322, the camera 330, the robotic devices 390, and the charging station 357. The one or more user devices 340, 350 provide the appropriate interfaces/processing to provide visual surveillance and reporting.

In other implementations, the system 300 further includes network 305 and the sensors 320, the home automation controls 322, the camera 330, the thermostat 334, the robotic devices 390, and the charging station 357 are configured to communicate sensor and image data to the one or more user devices 340 and 350 over network 305 (e.g., the Internet, cellular network, etc.). In yet another implementation, the sensors 320, the home automation controls 322, the camera 330, the thermostat 334, the robotic devices 390, and the charging station 357 (or a component, such as a bridge/router) are intelligent enough to change the communication pathway from a direct local pathway when the one or more user devices 340 and 350 are in close physical proximity to the sensors 320, the home automation controls 322, the camera 330, the thermostat 334, the robotic devices 390, and the charging station 357 to a pathway over network 305 when the one or more user devices 340 and 350 are farther from the sensors 320, the home automation controls 322, the camera 330, the thermostat 334, the robotic devices 390, and the charging station 357. In some examples, the system leverages GPS information from the one or more user devices 340 and 350 to determine whether the one or more user devices 340 and 350 are close enough to the sensors 320, the home automation controls 322, the camera 330, the thermostat 334, the robotic devices 390, and the charging station 357 to use the direct local pathway or whether the one or more user devices 340 and 350 are far enough from the sensors 320, the home automation controls 322, the camera 330, the thermostat 334, the robotic devices 390, and the charging station 357 that the pathway over network 305 is required. In other examples, the system leverages status communications (e.g., pinging) between the one or more user devices 340 and 350 and the sensors 320, the home automation controls 322, the camera 330, the thermostat 334, the robotic devices 390, and the charging station 357 to determine whether communication using the direct local pathway is possible. If communication using the direct local pathway is possible, the one or more user devices 340 and 350 communicate with the sensors 320, the home automation controls 322, the camera 330, the thermostat 334, the robotic devices 390, and the charging station 357 using the direct local pathway. If communication using the direct local pathway is not possible, the one or more user devices 340 and 350 communicate with the sensors 320, the home automation controls 322, the camera 330, the thermostat 334, the robotic devices 390, and the charging station 357 using the pathway over network 305.

In some implementations, the system 300 provides end users with access to images captured by the camera 330 to aid in decision making. The system 300 may transmit the images captured by the camera 330 over a wireless WAN network to the user devices 340 and 350. Because transmission over a wireless WAN network may be relatively expensive, the system 300 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the camera 330). In these implementations, the camera 330 may be set to capture images on a periodic basis when the alarm system is armed in an "away" state, but set not to capture images when the alarm system is armed in a "home" state or disarmed. In addition, the camera 330 may be triggered to begin capturing images when the alarm system detects an event, such as an alarm event, a door-opening event for a door that leads to an area within a field of view of the camera 330, or motion in the area within the field of view of the camera 330. In other implementations, the camera 330 may capture images continuously, but the captured images may be stored or transmitted over a network when needed.

In some implementations any of the actions performed by the control unit 310 may be performed by the monitoring application server 360 and/or the central alarm station server 370. Similarly, any of the actions performed by the monitoring application server 360 and/or the central alarm station server 370 may be performed by the control unit 310.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A monitoring system that is configured to monitor a property, the monitoring system comprising:
   a drone that is configured to navigate the property and generate sensor data that reflects an attribute of the property;
   a first drone dock that is located at the property and that is configured to receive the drone;
   a second drone dock that is located at the property and that is configured to receive the drone; and
   a monitor control unit that is configured to:
      receive data indicating whether the drone docked at the first drone dock or the second drone dock and the sensor data generated while the drone was docked at the first drone dock or the second drone dock;
      based on the data indicating whether the drone docked at the first drone dock or the second drone dock and the sensor data generated while the drone was docked at the first drone dock or the second drone dock, determine a status of the property; and
      provide, for output, data indicating the status of the property.

2. The system of claim 1, wherein the first drone dock and the second drone dock are configured to charge a battery of the drone while the drone is docked.

3. The system of claim 1, wherein the drone is configured to determine whether to dock at the first drone dock or the second drone dock based on an amount of power remaining in a battery of a drone.

4. The system of claim 1, wherein the monitor control unit is configured to:
   transmit, to the drone, an instruction to dock at the first drone dock or the second drone dock.

5. The system of claim 1, comprising:
   a sensor that is located at the property and that is configured to generate additional sensor data that reflects an additional attribute of the property,
   wherein the monitor control unit is configured to:
      receive the additional sensor data; and
      based on the additional sensor data, transmit, to the drone, an instruction to dock at the first drone dock.

6. The system of claim 1, wherein the first drone dock and the second drone dock are located on a ceiling of the property and are configured to couple to a top of the drone.

7. The system of claim 1, wherein the first drone dock and the second drone dock are configured to magnetically couple to the drone.

8. The system of claim 1, wherein the drone is configured to alternate docking at the first drone dock and the second drone dock.

9. The system of claim 1, wherein the monitor control unit is configured to:
   determine an arming status of the property;
   based on the arming status of the property, select the first drone dock or the second drone dock; and
   transmit, to the drone, an instruction to dock at the selected one of the first drone dock or the second drone dock.

10. The system of claim 1, wherein the first drone dock and the second drone dock are configured to mechanically couple to the drone.

11. A computer-implemented method comprising:
   receiving, by a monitoring system that is configured to monitor a property and from a drone that is configured to navigate the property, (i) data indicating whether the drone docked at a first drone dock that is located at the property or a second drone dock that is located at the property and (ii) sensor data that reflects an attribute of the property and generated while the drone was docked at the first drone dock or the second drone dock;
   based on the data indicating whether the drone docked at the first drone dock or the second drone dock and the sensor data generated while the drone was docked at the first drone dock or the second drone dock, determining, by the monitoring system, a status of the property; and
   provide, for output, data indicating the status of the property.

12. The method of claim 11, wherein the first drone dock and the second drone dock are configured to charge a battery of the drone while the drone is docked.

13. The method of claim 11, wherein the drone is configured to determine whether to dock at the first drone dock or the second drone dock based on an amount of power remaining in a battery of a drone.

14. The method of claim 11, comprising:
transmitting, to the drone, an instruction to dock at the first drone dock or the second drone dock.

15. The method of claim 11, comprising:
receiving, from a sensor that is located at the property, sensor data that reflects an additional attribute of the property; and
based on the additional sensor data, transmitting, to the drone, an instruction to dock at the first drone dock.

16. The method of claim 11, wherein the first drone dock and the second drone dock are located on a ceiling of the property and are configured to couple to a top of the drone.

17. The method of claim 11, wherein the first drone dock and the second drone dock are configured to magnetically couple to the drone.

18. The method of claim 11, wherein the drone is configured to alternate docking at the first drone dock and the second drone dock.

19. The method of claim 11, comprising:
determining an arming status of the property;
based on the arming status of the property, selecting the first drone dock or the second drone dock; and
transmitting, to the drone, an instruction to dock at the selected one of the first drone dock or the second drone dock.

20. The method of claim 11, wherein the first drone dock and the second drone dock are configured to mechanically couple to the drone.

* * * * *